United States Patent [19]
Holdren et al.

[11] Patent Number: 6,004,592
[45] Date of Patent: *Dec. 21, 1999

[54] PROCESS FOR MAKING PEPPERONI SAUSAGE

[75] Inventors: William C. Holdren; Don E. Alden; Rex M. Morton, all of Hutchinson, Kans.; James C. Bolton, Trophy Club, Tex.

[73] Assignee: Doskocil Food Service Company, L.L.C., S. Hutchinson, Kans.

[ * ] Notice: This patent is subject to a terminal disclaimer.

[21] Appl. No.: 08/877,411

[22] Filed: Jun. 16, 1997

Related U.S. Application Data

[63] Continuation-in-part of application No. 08/506,360, Jul. 24, 1995, Pat. No. 5,639,495.

[51] Int. Cl.$^6$ ................................................. A23L 1/317
[52] U.S. Cl. ............................................ 426/59; 426/646
[58] Field of Search ................................ 426/55, 57, 59, 426/646

[56] References Cited

U.S. PATENT DOCUMENTS

| | | | |
|---|---|---|---|
| 3,904,776 | 9/1975 | Magnino, Jr. et al. | 426/641 |
| 4,262,027 | 4/1981 | Tonner et al. | 426/325 |
| 4,279,935 | 7/1981 | Kentor | 426/264 |
| 4,362,750 | 12/1982 | Swartz | 426/59 |
| 4,492,712 | 1/1985 | Casella | 426/646 X |
| 4,497,845 | 2/1985 | Percel et al. | 426/646 |
| 4,511,592 | 4/1985 | Percel et al. | 426/646 |
| 4,576,825 | 3/1986 | Tracy et al. | 426/266 |
| 4,731,006 | 3/1988 | Freda et al. | 425/190 |
| 4,772,477 | 9/1988 | Weiss et al. | 426/99 |
| 4,800,094 | 1/1989 | Freda et al. | 426/513 |
| 4,844,922 | 7/1989 | Uemura et al. | 426/646 X |
| 5,160,758 | 11/1992 | Parks et al. | 426/509 |
| 5,183,683 | 2/1993 | Mott et al. | 426/641 |

FOREIGN PATENT DOCUMENTS

| | | |
|---|---|---|
| 546429 | 9/1957 | Canada . |
| 896958 | 4/1972 | Canada . |

OTHER PUBLICATIONS

Considine et al., *Foods and Food Production encylopedia*, pp. 1160–1199, dated 1982.
Price et al., *The Science of Meat and Meat Products Third Edition*, pp. 478–483, dated 1987.
"Minimizing Cupping and Curling in Pepperoni", *Meat Marketing & Technology*, p. 46, dated Aug., 1993.
Egbert et al., "Development of Low Fat Ground Beef", *Food Technology*, pp. 64, 66–68, 70–72 and 426–646.
"Durkote Citric Acid 150–85—Encapsulated Citric Acid" product data sheet of Van Den Bergh Food Ingredients Group, dated 1993.
"Balchem Cap–Shure C–135–72 Curing Agent—Meat" product data sheet of Balchem Corporation, dated Jan., 1994.
Long et al., "Food Products Formulary", vol. 1, *Meat, Poultry, Fish, Shellfish*, pp. 37–59, dated 1982.

Primary Examiner—Arthur L. Corbin
Attorney, Agent, or Firm—Shook, Hardy & Bacon L.L.P.

[57] ABSTRACT

A dry or semi-dry sausage product is provided which includes up to 15% by weight of an added particulate protein component. The added protein component is in addition to the protein present in the meat used in the sausage mixture and serves to improve the performance of the resulting product, particularly after the sausage has been heat treated at high temperatures during processing to eliminate pathogens which may be present in the ingredient mix. The added protein component is typically a denatured or hydrolyzed protein and can include one or more of meat stock, milk protein hydrolyzate, yeast extract, hydrolyzed yeast, autolyzed yeast, hydrolyzed vegetable protein, hydrolyzed animal protein and cooked meat.

14 Claims, No Drawings

PROCESS FOR MAKING PEPPERONI SAUSAGE

This application is a continuation-in-part of application Ser. No. 08/506,360 filed on Jul. 24, 1995, now U.S. Pat. No. 5,639,495.

BACKGROUND OF THE INVENTION

The present invention relates in general to sausages and, more particularly, to dry and semi-dry sausages and their preparation.

Dry and semi-dry sausages are generally classified as those sausages which have a relatively hard or chewy texture and have been fermented by allowing growth of selected bacteria during processing. The fermentation causes an accumulation of lactic acid and other byproducts which impart a tangy flavor to the sausage. Pepperoni, genoa, and hard salami are examples of popular dry sausages.

Production of most sausages is a very time-consuming process. In a typical process for preparing dry sausage, raw materials such as boneless chucks, beef trimmings, and regular lean pork are chopped and/or ground and then mixed with curing salts, seasonings and a starter culture of lactic acid producing bacteria. The mixture is stuffed into casings and the product is placed in fermentation rooms under controlled conditions to allow growth of the lactic acid producing bacteria. The bacteria causes fermentation of carbohydrates to produce the lactic acid which gives the sausage its characteristic flavor. The lactic acid also serves to lower the pH of the meat proteins toward their isoelectric point. This is particularly desirable because the meat proteins are less able to bind moisture as they approach their isoelectric point, thereby facilitating subsequent drying of the sausage.

Once the dry sausage is released from the fermentation room, it is typically placed in a drying room at temperatures in the range of 50° F. to 75° F. and relative humidities of 55 to 85% until the desired ratio of moisture to protein is achieved. In many instances, water in amounts up to 30 to 40% of the initial weight of the sausage must be removed over a period of several weeks or longer before the predetermined moisture to protein ratio is reached. Although more rapid drying such as by using higher temperatures would be desirable in order to reduce the processing time, the drying process must be conducted in a uniform and gradual manner in order to ensure a quality product. Rapid drying can cause hardening of the sausage casing which, in turn, can retard removal of moisture from the interior of the sausage.

Subjecting the sausage to high temperatures during drying or other processing steps may also adversely affect the suitability of the finished product for certain applications. For example, pepperoni slices used as pizza toppings should not cup or curl at the edges during cooking of the pizza because of the tendency for liquid to pool in the cupped slices and the likelihood that the edges will burn or dry out. Use of high temperatures during processing of the pepperoni is one factor which has been determined to contribute to cupping of the pepperoni slices.

In addition to the extended time periods required to properly dry sausages, governmental regulations require that dry and semi-dry sausage which are not cooked during processing be heat treated by holding the sausage for predetermined time periods at preselected temperatures. These times and temperatures are selected to ensure destruction of microorganisms such as trichinae which may be present in the meat and can lead to serious illness or death in humans. The time period required for drying is shortened by the use of higher temperatures and can be instantaneous when the product's internal temperature reaches approximately 145° F. The use of these high temperatures during processing, however, can be detrimental to the performance of the final product when used for certain purposes such as pizza toppings. As a result, a need has developed for a sausage which can be processed at elevated temperatures without adversely affecting the performance of the resulting product.

SUMMARY OF THE INVENTION

It is a primary object of this invention to provide a dry or semi-dry sausage which may be processed at elevated temperatures to destroy pathogens and other microorganisms without detracting from the performance of the resulting product.

As a corollary to the preceding object, it is also an object of this invention to provide a dry or semi-dry sausage which can be produced quickly by using high temperatures to instantaneously destroy pathogens which may be present in the sausage ingredients.

It is another object of this invention to provide a dry or semi-dry sausage which can reach the desired moisture to protein ratio more quickly during the drying process so that the sausage need not spend as much time in the drying room as is required of conventional sausages.

It is still another object of this invention to provide a dry or semi-dry sausage which may be processed at elevated temperatures to destroy pathogens and speed water removal without adversely affecting the quality and performance of the product.

It is a further object of this invention to provide a dry or semi-dry sausage which has an elevated initial protein content so that less moisture need be removed to reach the desired moisture to protein ratio during processing, thereby speeding the drying time for the sausage.

It is a yet further object of this invention to provide a dry sausage such as pepperoni which is resistant to cupping when sliced and cooked, such as on a pizza, so that liquid does not pool on the surface of the pepperoni slices and the edges of the slices do not burn or dry out during the cooking process.

To accomplish these and other related objects of the invention, in one aspect the invention is related to a dry or semi-dry sausage having an added particulate protein component present in an amount from 0.1 to 15% by weight based on the total weight of the sausage ingredients. The added particulate protein component is typically one or more hydrolyzed and/or denatured proteins selected from the group consisting of meat stock, milk protein hydrolyzate, yeast extract, hydrolyzed yeast, autolyzed yeast, hydrolyzed vegetable protein, hydrolyzed animal protein and cooked meat. The added particulate protein component is more desirably present in an amount between 0.5 and 10% by weight and desirably has particle sizes so that approximately 100% of the particles will pass through a 10 mesh screen (U.S. Standard Sieve). Notably, when added to the sausage mix, the protein component provides more uniform shrinkage during subsequent heat treatment. This allows the sausage to be heat treated at temperatures of up to approximately 160° F. to instantaneously kill pathogens without resulting loss of performance such as when the final product is sliced and used as pizza toppings.

In another aspect, the invention is related to a process for making the dry or semi-dry sausage, comprising the steps of mixing together comminuted meat with seasonings and an added particulate protein component to form a mixture, placing the mixture into casings, fermenting the mixture in the casings, heating the fermented mixture to a temperature of up to and including approximately 160° F. and drying the fermented mixture to produce the dry or semi-dry sausage product. In a presently preferred variation of the process, the heating and drying steps are reversed. In this preferred process, the fermented mixture is dried to a moisture to protein ratio of approximately 1.6 to 1 and is then heated to a temperature of approximately 140–160° F. for a time sufficient to kill pathogens.

DESCRIPTION OF THE PREFERRED EMBODIMENTS

The present invention is directed to dry and semi-dry sausage having a particulate protein component which is added to and mixed with the meat and other ingredients used in the sausage manufacture. It has been found that addition of the particulate protein component produces a sausage product which can be heated to internal temperatures as high as 145° F. or higher during processing without adversely affecting the performance of the product, such as when sliced and used as a pizza topping. The ability to heat the sausage to such temperatures during processing without detracting from product performance is particularly desirable because many pathogens can be immediately destroyed by those high temperatures. Although the reasons why the particulate protein component improves the product performance are not fully understood at the present time, the protein acts to reduce nonuniform shrinkage of the product when subjected to high temperatures.

The particulate protein component may be mixed with the meat at any suitable stage of the sausage preparation process, although typically it will be added with the seasonings and curing agents normally used in sausage manufacture. The proteins which have proven successful in the present invention are generally non-gelling and non-coagulating and have relatively low to no water binding capacity. Proteins which possess these characteristics have typically been denatured or are hydrolyzed from their natural state. The proteins should also be suitable for use in foods and have a flavor which does not detract from the desired flavor of the sausage product.

Examples of proteins suitable for use in the present invention include but are not limited to meat stock, milk protein hydrolyzate, yeast extract, hydrolyzed yeast, autolyzed yeast, hydrolyzed vegetable protein, and hydrolyzed animal protein. Meat stock is a water extract from boiling meat, with beef stock being the most preferred added protein. Other suitable meat stocks include pork and poultry stock. Cooked meat which has been treated to eliminate or substantially reduce its binding ability may also be used.

Proteins which are used as the particulate protein component should be non-gelling so they do not detract from the texture and appearance of the resulting sausage. Proteins which would otherwise coagulate or form a gel when subjected to dry sausage processing temperatures and conditions should be treated to prevent such coagulation or gelling during processing of the sausage. Suitable treatment processes are well known to those of skill in the art and typically involve heating of the protein. For example, textured soy proteins when heated to a temperature of 160° F. will not form a gel when subsequently heated to normal dry sausage processing temperatures. Beef stock and hydrolyzed vegetable, animal, dairy and yeast proteins are other examples of suitable proteins which may be treated to prevent coagulation or gelling.

The particulate protein component should either be non-water binding or should only lightly bind water so that the dry sausage drying times are not unnecessarily prolonged and are preferably reduced. The particulate protein should thus release water during drying conditions at a rate similar to, or faster than, the release rate of the meat which is used in the dry sausage. As a result, the denatured or hydrolyzed proteins are generally preferred for use in the present invention because of their reduced binding affinity for water.

The particulate protein component should also have a flavor which is compatible with the desired flavor for the resulting dry sausage product. Proteins with a bland flavor, such as lightly hydrolyzed proteins, are desirable because they are less likely to detract from the desired flavor of the product. Other proteins having certain characteristic flavors can also be used and may be preferred in certain instances. For example, beef stock and heavily hydrolyzed proteins have a more beef-like flavor which is compatible with the desired flavor of many types of dry sausages such as pepperoni.

The particles of the protein component can vary somewhat in size but should be preferably sized so that approximately 100% of the particles will pass through a 10 mesh screen and be retained on a 400 mesh screen (U.S. Standard Sieve) and more preferably are sized so that approximately 100% of the particles will pass through a 60 mesh screen and be retained on a 200 mesh screen (U.S. Standard Sieve). The particulate protein component can be in any suitable form, including as a dry powder, concentrated paste, solution or emulsion.

The particulate protein component may be present in any amount which will produce a dry or semi-dry sausage product with the desired characteristics, including an acceptable color, flavor, texture, appearance and performance. If too much of the added protein component is present, an unacceptable taste may be imparted to the sausage. Similarly, the appearance of the sausage may be adversely affected by the presence of too much of the particulate protein component. Dry and semi-dry sausages should normally provide clear visual definition for the individual ingredients. The presence of too much fine textured protein will detract from the desired ingredient definition and "smearing" of the product may result. It will of course be appreciated that the individual characteristics of the particulate protein component which is selected for use will influence the amount of particulate protein component which can be utilized.

In general, the added protein component may be present in an amount of 0.1 to 15% by weight, more preferably 0.5 to 10% by weight and most preferably approximately 1 to 5% by weight. Unless otherwise indicated, all weight percentages expressed herein are based on the total weight of the ingredients prior to drying of the sausage.

The dry and semi-dry sausages of the present invention are typically prepared by reducing the meat to particles of the desired size, typically by grinding or chopping to one-half inch in diameter, and then mixing the other ingredients, including the added protein component, with the ground or chopped meat. The starter culture of lactic acid bacteria is diluted prior to mixing with the chopped meat. The use of acidulents in place of the starter culture of Lactic acid producing bacteria is known in the art of sausage production and may be employed in the present invention. Acidulents such as citric acid are typically encapsulated to prevent premature interaction of the acid and the meat. The mixture is then subjected to a finish grinding step in which the meat is further reduced to the desired size for the particular product. The mixture is then stuffed into casings and held in a green room for a period of time at appropriate conditions to cause fermentation. Once the pH of the stuffed sausage reaches a preselected value, it is subjected to heating to raise the internal temperature of the sausage up to as high at 160° F. for a brief period of time to kill trichinae. Dry sausage is then placed in a drying room and held at temperatures and relative humidities to provide uniform drying of the sausage until the desired moisture to protein ratio is achieved. The product is then removed from the drying room and can be further processed as desired. It will of course be appreciated that the process can be varied as required for particular sausage recipes.

In a presently preferred process for preparing pepperoni dry sausage, the fermented product is subjected to the drying step before it is heat treated to kill trichinae and other pathogens. When heating the dried product in this process, it is preferred that internal temperatures of approximately 140° F. or up to 160° F. are achieved for a sufficient period of time to kill trichinae and pathogens under approved governmental regulations for time and temperature.

Use of the particulate protein component of the present invention in the preparation of the pepperoni type of dry sausage is particularly beneficial because of the popularity of pepperoni slices as a pizza topping. Normally, when pepperoni is processed at the temperatures of the present inventions, the resulting sliced product will cup during cooking and grease will pool in the center of the pepperoni slices. The protein component used in accordance with the present invention produces a product which can be instantaneously or more rapidly heat treated, but resists cupping or curling when subsequently cooked as a sliced topping on pizza, including when cooked using an impingement cooking process.

Advantageously, the particulate protein component significantly reduces the sausage drying time by reducing the amount of moisture which must be removed from the sausage to achieve the target moisture to protein ratio. In some instances, the particulate protein component actually facilitates removal of moisture from the sausage during drying and can thus further reduce the required drying time.

The following examples are set forth for purposes of illustration but it is to be understood that the invention is not limited to the illustrated embodiments.

EXAMPLE 1

A pepperoni dry sausage product is prepared using the following ingredients in the indicated parts by weight:

| Ingredient | Parts |
|---|---|
| Beef and/or Pork | 93.4 |
| Beef Stock | 2.0 |
| Salt | 3.3 |
| Spices | 0.7 |
| Dextrose | 0.5 |
| Culture | 0.1 |
| Cure | 0.01 |

The meat is ground or chopped into one-half inch diameter particles and the remaining ingredients are then added and mixed with the chopped meat. The starter culture and seasonings are blended with the chopped meat. The mixture is then further ground to reduce the meat particle size to approximately ⅛ of an inch. The raw finished product is then stuffed into casings and placed in a fermentation room. The product is held in the fermentation room at a temperature in the range of 50° F. to 120° F. until a pH of 5.1 or lower is obtained. The product is heated to an internal temperature of up to 160° F. for a time sufficient to kill trichinae. It is then placed in a drying room at a maximum temperature of 55° F. until a moisture to protein ratio of no greater than 1.6 to 1 is achieved.

EXAMPLE 2

A pepperoni dry sausage product was prepared using the following ingredients in the indicated parts by weight:

| Ingredient | Parts |
|---|---|
| Beef and/or Pork | 93.4 |
| Beef Stock | 2.7 |
| Salt | 3.3 |
| Spices | 0.7 |
| Dextrose | 0.5 |
| Culture | 0.1 |
| Cure | 0.01 |

The meat was ground or chopped into one-half inch diameter particles and the remaining ingredients were then added and mixed with the chopped meat. The starter culture and seasonings were blended with the chopped meat. The mixture was then further ground to reduce the meat particle size to approximately ⅛ of an inch. The raw finished product was then stuffed into casings and placed in a fermentation room. The product was held in the fermentation room at a temperature in the range of 50° F. to 120° F. until a pH of 5.1 or lower was obtained. The product was placed in a drying room at a maximum temperature of 55° F. until a moisture to protein ratio of no greater than 1.6 to 1 was achieved. The product was then moved to an oven and heated to an internal temperature of 145° F. for a time sufficient to kill trichinae.

EXAMPLE 3

The pepperoni product made by the process of Example 2 was chilled and then sliced and placed on a pizza. The pizza was then baked in an oven at 500° F. until fully cooked. The cooked pepperoni did not cup and the surface fat was minimal. A control product was prepared by the same process as Example 2 except beef stock was omitted from the composition. The control product was chilled, sliced and baked on a pizza at 500° F. in the same manner as the inventive product. The cooked control product cupped severely and fat pooled in the cupped slices. In addition to better performance, the inventive pepperoni had a darker coloration than the control, a desirable characteristic normally indicative of a product having a higher beef content. Another desirable characteristic exhibited by the inventive pepperoni was a slightly firmer texture than conventional pepperoni.

From the foregoing, it will be seen that this invention is one well adapted to attain all the ends and objects hereinabove set forth together with other advantages which are inherent to the process and product.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth is to be interpreted as illustrative and not in a limiting sense.

Having thus described the invention, what is claimed is:

1. A process for making a pepperoni sausage, said process comprising:

mixing together comminuted meat with seasonings, an added particulate protein component, and a lactic acid bacteria starter culture to form a mixture, said added particulate protein component being selected from the group consisting of meat stock and cooked meat;

placing said mixture into casings;

fermenting said mixture in the casings;

heating said fermented mixture to an internal temperature of up to 160° F. for a time sufficient to kill any trichinae present in said fermented mixture; and then drying said fermented mixture.

2. The process as set forth in claim 1, wherein said step of drying comprises drying said fermented mixture to a moisture to protein ratio of approximately 1.6 to 1.

3. The process as set forth in claim 1, wherein approximately 3 to 5% by weight, based on the total weight of the pepperoni sausage ingredients, of said added particulate protein component is mixed with said comminuted meat.

4. The process as set forth in claim 1, wherein between approximately 0.5 to 10% by weight, based on the total weight of the pepperoni sausage ingredients, of said added particulate protein component is mixed with said comminuted meat.

5. The process as set forth in claim 4, wherein said added particulate protein component is meat stock.

6. The process as set forth in claim 4, wherein said added particulate protein component is cooked meat.

7. The process as set forth in claim 5, wherein said added particulate protein component is beef stock.

8. A process for making a pepperoni sausage, said process comprising:

mixing together comminuted meat with seasonings, an added particulate protein component, and an acidulent to form a mixture, said added particulate protein component being selected from the group consisting of meat stock and cooked meat;

placing said mixture into casings;

heating said mixture while in the casings to an internal temperature of up to 160° F. for a time sufficient to kill any trichinae present in said mixture; and then drying said mixture.

9. The process as set forth in claim 8, wherein said step of drying comprises drying said mixture to a moisture to protein ratio of approximately 1.6 to 1.

10. The process as set forth in claim 8, wherein approximately 3 to 5% by weight, based on the total weight of the pepperoni sausage ingredients, of said added particulate protein component is mixed with said comminuted meat.

11. The process as set forth in claim 8, wherein between approximately 0.5 to 10% by weight, based on the total weight of the pepperoni sausage ingredients, of said added particulate protein component is mixed with said comminuted meat.

12. The process as set forth in claim 11, wherein said added particulate protein component is meat stock.

13. The process as set forth in claim 11, wherein said added particulate protein component is cooked meat.

14. The process as set forth in claim 11, wherein said added particulate protein component is beef stock.

* * * * *